United States Patent [19]

Ohmura

[11] 4,080,748
[45] Mar. 28, 1978

[54] LINE GUIDE ASSEMBLY FOR FISHING RODS

[75] Inventor: Ryuichi Ohmura, Shizuoka, Japan

[73] Assignee: Fuji Kogyo Co., Ltd., Shizuoka, Japan

[21] Appl. No.: 678,493

[22] Filed: Apr. 20, 1976

[30] Foreign Application Priority Data

May 1, 1975 Japan .................................. 50-53503

[51] Int. Cl.² .......................................... A01K 87/04
[52] U.S. Cl. ................................................. 43/24
[58] Field of Search ............................................... 43/24

[56] References Cited

U.S. PATENT DOCUMENTS

| 2,452,788 | 11/1948 | Peters | 43/24 |
| 2,502,845 | 4/1950 | Hoffman | 43/24 |

FOREIGN PATENT DOCUMENTS

| 2,263,686 | 10/1975 | France | 43/24 |
| 1,218,143 | 1971 | United Kingdom | 43/24 |
| 1,364,789 | 1974 | United Kingdom | 43/24 |
| 1,383,521 | 2/1975 | United Kingdom | 43/24 |

Primary Examiner—Louis G. Mancene
Assistant Examiner—Peter K. Skiff
Attorney, Agent, or Firm—Cantor and Singer

[57] ABSTRACT

A metallic main frame including an eye ring and a seat tube joined in one body to the eye ring is coupled with an elastic protective sleeve to be inserted over fishing rods. The elastic nature of the protective sleeve tends to do less damage to the surface of the fishing rods and the absence of a brazed joint assures enhanced strength of the assembly construction.

5 Claims, 5 Drawing Figures

LINE GUIDE ASSEMBLY FOR FISHING RODS

SUMMARY OF THE INVENTION

The present invention relates to a line guide assembly for fishing rods, more particularly the present invention relates to improvements in the construction of a line guide assembly for passage of the fishing rods having a part adapted for fishing line and a part adapted for assembly mounting to fishing rods.

The prior art line guide assembly is placed on telescopic type fishing rods in a manner as to be displaceable along the length of the rod and the parts thereof, i.e. the part adapted for passage of the fishing line, and the part adapted for mounting of the assembly to the fishing rod, is joined thereto by brazing. The presence of such brazed joints between parts lowers the strength of the assembly construction considerably. In addition, as the part to come into direct contact with the fishing rod is made of a metallic material, the conventional assembly tends to hurt the surface of the fishing rod to which it is mounted. In addition, as the entire body of the assembly is made of a metallic material, the conventional assembly is too heavy to handle and awkward to carry.

It is the principal object of the present invention to provide line guide assembly for fishing rods of a an extremely strong construction.

It is another object of the present invention to provide a line guide assembly for fishing rods which minimizes damage the surface of the fishing rods when mounted.

It is the other object of the present invention to provide a line guide assembly for a fishing rod of a remarkably light construction.

BRIEF DESCRIPTION OF THE INVENTION

In accordance with the present invention, the assembly is comprised of a main frame made of a metallic material and a protective sleeve made of an elastic material such as a synthetic resin. The main frame is of an integral single body construction and includes an eye ring adapted for passing a fishing line therethrough and a seat tube adapted for mounting the assembly to a fishing rod. The axial length of the protective sleeve is designed longer than that of the seat tube of the main frame.

In a preferred embodiment of the present invention, one end of the seat tube of the main frame has an inner circular edge encroaching against the periphery of the protector sleeve over which the seat tube is forcedly inserted.

In a further preferred embodiment of the present invention, axially aligned grooves are formed in the inner periphery of the seat tube of the main frame in order to establish a stable and reliable coupling of the main frame with the protector sleeve.

When the protective sleeve comes into direct contact with the fishing rod, the elongated sleeve can rest quite stably on the same. On the other hand, as this part is made of an elastic material, such a relatively long covering of the fishing rod by the part does not hinder free bending of the fishing rod.

Although the line guide assembly in accordance with the present invention is made displaceable along the length of the fishing rod, it can be fixed at any longitudinal position of the fishing rod using, e.g. bonding agents.

BRIEF DESCRIPTION OF THE DRAWING

Further features and advantages of the present invention will be made clearer from the following description, reference being made to the embodiments shown in the attached drawings, in which.

DESCRIPTION OF THE PREFERRED EMBODIMENT

Figure 1:
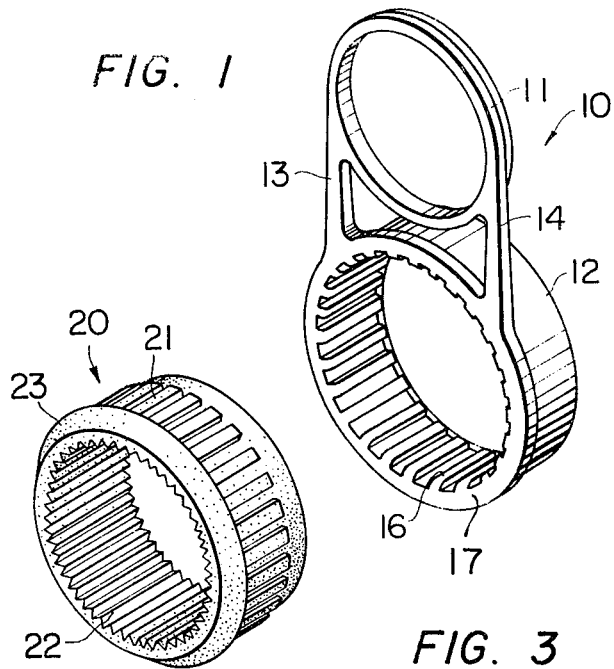
FIG. 1 is a perspective view of an embodiment of the present invention in a disassembled state.

An embodiment of the line guide assembly for fishing rods in accordance with the present invention is illustrated in FIG. 1, in which the assembly includes a main frame 10 and a protective sleeve 20 coupled with the main frame 10.

The main frame 10 is of a single integral construction formed by applying mechanical stamping to a metallic plate and comprised of an eye ring 11, for passing a fishing line therethrough, a seat tube 12 for mounting the assembly to a fishing rod and a pair of arms 13 and 14 for connecting the ring 10 with the tube 12.

Figure 3:
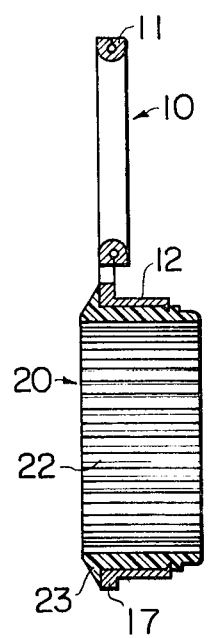
FIG. 3 is a sectional side view of the assembly shown in FIG. 1.
Figure 4:
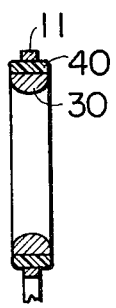
FIG. 4 is a sectional side view of the main part of another embodiment of the present invention.

The inner periphery of the eye ring 11 is rounded as shown in FIG. 3 in order to provide a smooth surface for passage of the fishing line. As a substitute for this surface rounding, a guide ring 30 made of a material of high abrasion resistance such as a ceramic may be inserted snugly into the eye ring 11 in combination with an intermediate cushion ring 40 made of a resilient material such as a synthetic resin. Such an alternative construction is shown in FIG. 4, in which the guide ring 30 is rounded on its inner periphery.

Figure 5:
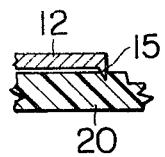
FIG. 5 is an enlarged sectional side view for showing stable coupling system of the assembly shown in FIG. 1.

The projecting end of the seat tube 12 is provided with an inner circular edge 15 which encroaches against the outer periphery of the protective sleeve 20 in order to prevent accidental separation of the protective sleeve 20 as shown in FIG. 5.

The seat tube 12 is provided with a number of axially aligned grooves 16 formed in the inner periphery thereof. The presence of such grooves 16 effectively bars relative axial turning between the seat tube 12 and the protective sleeve 20. In this sense, it is more preferable that corresponding number and shape of axially aligned projections 21 are formed on the outer periphery of the protective sleeve 20.

The protective sleeve 20 of elastic nature is used in the present invention for the purpose of assuring stable mounting of the assembly to fishing rods of the tapered type. In order to provide a further enhanced stability in the mounting, the protective sleeve 20 is preferably provided with numerous axially aligned indentations 22 on the inner periphery thereof. The protective sleeve 20 is further provided on one end thereof with an outer flange 23 in order to prevent separation of the seat tube 12 off the protective sleeve 20 as shown in FIG. 3.

The length of the protective sleeve 20 should be larger than that of the seat tube 12 of the main frame 20 so that the protective sleeve 20 is exposed on both ends out of the seat tube 12.

Figure 2:
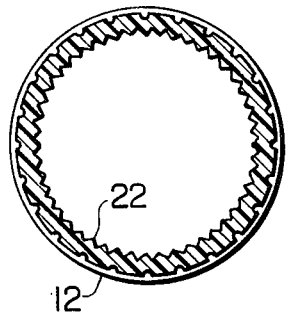
FIG. 2 is a sectional view of a part of the assembly shown in FIG. 1.

In the coupled state, the axially aligned projections 21 of the protective sleeve 20 are quite snugly received and rest in the axially aligned grooves 16 of the seat tube 12 of the main frame 1 as shown in FIG. 2.

The protective sleeve 20 should be coupled to the seat tube 12 of the main frame 10 in the following manner. The protective sleeve 20 is inserted into the seat tube 12 from the side of the outer flange 17 of the latter until the outer flange 23 of the protective sleeve 20 abuts the outer flange 17 of the seat tube 12. The axial size of the protective sleeve 20 is designed larger than that of the seat tube 12 and, therefore, one end of the protective sleeve 20 projects beyond the corresponding end of the seat tube 12 when two are coupled to each other.

In fixing of the protective sleeve 20 to the seat tube 12, the inserting movement of the protecting sleeve 20 is stopped by the abutment of its outer flange 23 with the seat tube 12. The movement of the protecting sleeve 20 opposite to the insertion is barred by encroachment of the tooth-shaped inner circular edge 15 upon the outer peripheral surface of the protective sleeve 20. As the edge is formed in a tooth-like shape, no provision of a particular annular groove receptive of the edge is needed.

In accordance with the present invention, the part of the assembly to come in direct contact with the fishing rod is made of an elastic material such as a synthetic resin and this assures reduced damage on the surfaces of fishing rods to which the assembly is mounted. In addition, the metallic main frame is in the form of an integral single body and, therefore, absence of the brazed joint assures enhanced strength of the assembly construction.

What is claimed is:

1. A line guide assembly for a fishing rod comprising, in combination, a metallic main frame of an integral single body construction, said main frame having a seat tube for receiving the fishing rod, a pair of substantially parallel arms upstanding from one edge of said tube, and an eye ring for passing a fishing line therethrough, supported by said arms with its axis parallel to the axis of said seat tube; and an elastic protective sleeve forcedly inserted into said seat tube, the axial length of said sleeve being larger than that of said seat tube; said seat tube having a plurality of axially aligned grooves in the inner periphery thereof and said sleeve having a corresponding number and shape of axially aligned projections on the outer periphery thereof, said grooves and projections thereby cooperating to prevent relative axial movement between said sleeve and said tube; said sleeve having a flange around the outer periphery and at one end thereof, said flange abutting one end of said tube; said tube having a circular lip at the inner periphery of the other end thereof to engage the outer surface of said elastic sleeve; said flange and said lip thereby preventing separation of said tube and said sleeve; said sleeve having a plurality of axially aligned indentations on the inner periphery thereof to provide a secure grip on the fishing rod.

2. A line guide assembly as claimed in claim 1 in which the inner periphery of said eye ring of said main frame is convexly rounded.

3. A line guide assembly as claimed in claim 1 further comprising an elastic intermediate ring forcedly inserted into said eye ring of said main frame and a guide ring of high abrasion resistance forcedly inserted into said intermediate ring.

4. A line guide assembly as claimed in claim 3 in which said guide ring is made of a ceramic.

5. A line guide assembly as claimed in claim 1 in which said protective sleeve is made of a synthetic resin.

* * * * *